(12) United States Patent
Glater

(10) Patent No.: US 6,286,321 B1
(45) Date of Patent: Sep. 11, 2001

(54) CONDENSER COLD TRAP UNIT WITH SEPARATE FRACTION COLLECTION FEATURE

(75) Inventor: Michael Glater, Brooklyn, NY (US)

(73) Assignee: Thermo Savant, Inc., Holbrook, NY (US)

(*) Notice: Subject to any disclaimer, the term of this patent is extended or adjusted under 35 U.S.C. 154(b) by 0 days.

(21) Appl. No.: 09/476,499

(22) Filed: Jan. 3, 2000

(51) Int. Cl.[7] ............................................. B01D 8/00
(52) U.S. Cl. .................................................. 62/55.5
(58) Field of Search ................................... 62/55.5

(56) References Cited

U.S. PATENT DOCUMENTS

| | | | |
|---|---|---|---|
| 3,144,756 | * 8/1964 | Arnold et al. | 62/269 |
| 3,435,624 | * 4/1969 | Rockenfeller | 62/55.5 |
| 3,712,074 | * 1/1973 | Boissin | 62/55.5 |
| 4,114,287 | * 9/1978 | Fraser | 34/92 |
| 4,432,208 | * 2/1984 | Onuki et al. | 62/55.5 |

* cited by examiner

Primary Examiner—William Doerrler
Assistant Examiner—Malik N. Drake
(74) Attorney, Agent, or Firm—Morrison Law Firm

(57) ABSTRACT

A condenser cold trap unit for recovering as separate primary and secondary condensate fractions solvents contained in an effluent drawn from products being dried in a vacuum chamber includes inner and outer shell vessels, the inner shell vessel be disposed coaxially with the outer shell vessel inside said outer shell vessel with a space being present in the outer shell vessel under the bottom of the inner shell vessel and in a course surrounding the exterior of the inner shell vessel. A cover closes off the open tops of the two shell vessels and the interior space of the outer shell vessel is sealed from communication with outside atmosphere, and the interior space of the inner shell vessel is sealed from any communication with the interior space of the outer shell vessel. A common refrigeration coil encircles the exterior of the inner shell vessel and extends down therefrom to effect solvents condensing temperature levels cooling in both shell vessels. Fittings on the cover allows for connection of the outer vessel condensing chamber with outlet from the drying chamber and for passing effluent subjected to primary solvent fraction condensing in the outer vessel chamber to the inlet of the vacuum pump that evacuates the chamber. Cover fittings allow return of exhaust from the vacuum pump to be directed into the inner vessel for condensing solvent secondary fraction and for venting solvent free gas to the outside atmosphere. Drain fittings at the bottom of each vessel allow draining collected recovered solvent to disposal.

14 Claims, 3 Drawing Sheets

CONDENSER COLD TRAP UNIT WITH SEPARATE FRACTION COLLECTION FEATURE

BACKGROUND OF THE INVENTION

The present invention relates to recovery of solvents from the effluent which evolves in a vacuum drying operation, and refers more particularly to a cold trap unit wherein condensing of the solvents is effected.

In the drying of, e.g., solvent-containing biological specimens, the drying of specimens commonly is done in a chamber maintained under a condition of vacuum. During drying, an effluent in which vaporized solvents are contained is given off from the operation. It is understood that the solvents should be recovered from the effluent for several reasons.

One is the need to reduce as much as possible carryover of solvent from the chamber to the vacuum pump used to maintain the chamber under vacuum as the solvents have corrosive properties that can cause pump damage. Another reason is to minimize entry of solvents to normal ambient atmosphere since solvents presence in the atmosphere can be harmful to humans.

The common practice for solvents recovery utilized two separate cold traps. Effluent from the chamber is directed into a first of these cold traps after the effluent leaves the drying chamber but before the location of the inlet to the vacuum pump. Solvents in the effluent condense is this first cold trap but solvent condensation therein may not be total so that the effluent outflowing the first cold trap to the inlet of the vacuum pump contains solvents carryover.

This solvents carryover passes through the vacuum pump and leaves is as gas exhaust from the pump outlet. The gas exhaust is then directed through a second cold trap to condense out the carryover solvents.

The foregoing described recovery practice has some disadvantages. Notable is the need for space for locating two separate cold traps. Space sometimes is at a premium in a laboratory where many of such practiced drying operations take place so that finding locations for two cold traps proximal the drying chamber and convenient to the scientist or technician can be a problem.

Since cold traps operate at sub-zero temperatures, it is necessary to provide a separate refrigeration source for each of the two cold traps. Additionally, use of separate cold traps does not allow convenience of immediate presence at a single location of all collected condensate thereby to facilitate disposal of same.

OBJECTS AND SUMMARY OF THE INVENTION

Accordingly, it is an object of the invention to provide a condenser cold trap unit which overcomes the drawbacks of the prior art.

It is a further object of the invention to provide a condenser cold trap unit for condensing separate fractions of solvents evolved from a specimen drying operation in a vacuum chamber which uses a single refrigeration source for maintaining solvents condensing temperature levels in each of two separate condensing vessel spaces.

It is a still further object of the invention to provide a condenser cold trap unit which is of less space occupying character than the separate cold traps used for the same purpose.

Another object is to provide a condenser cold trap that is more economical to make and use than the two separate cold traps employed in the prior art for the same solvents recovery end purpose.

Briefly stated, there is provided a condenser cold trap unit for recovering as separate primary and secondary condensate fractions, solvents contained in an effluent drawn from products being dried in a vacuum chamber. The unit includes inner and outer shell vessels. The inner shell vessel is disposed coaxially with the outer shell vessel inside said outer shell vessel. A space is present in the outer shell vessel under the bottom of the inner shell vessel and in a course surrounding the exterior of the inner shell vessel. A cover closes off the open tops of the two shell vessels and the interior space of the outer shell vessel is sealed from communication with outside atmosphere. The interior space of the inner shell vessel also is sealed from any communication with the interior space of the outer shell vessel. A common refrigeration coil encircles the exterior of the inner shell vessel and extends down therefrom to provide solvents condensing temperature levels cooling in both shell vessels. Fittings on the cover allow for connection of the outer vessel condensing chamber with outlet from the drying chamber and for passing effluent subjected to primary solvent fraction condensing in the outer vessel chamber to the inlet of the vacuum pump that evacuates the chamber. Cover fittings allow return of exhaust from the vacuum pump to be directed into the inner vessel for condensing solvent secondary fraction and for venting solvent free gas to the outside atmosphere. Drain fittings at the bottom of each vessel allow draining collected recovered solvent to disposal.

In accordance with these and other objects of the invention, there is provided a condenser cold trap unit for recovering as primary and secondary condensate fractions solvents contained in an effluent drawn from products being dried in a chamber maintained under a condition of vacuum by a vacuum pump, which comprises an outer containment housing and an inner containment housing within the outer containment housing. The outer containment housing has an interior space at least a part of which provides a primary condensate collection well. The inner containment housing has an interior space providing a secondary condensate collection well. The interior space of the outer containment housing is sealed against any inflow thereto of ambient atmospheric air. It also is sealed against any inflow/outflow communication between the outer containment housing interior space and the inner containment housing interior space. Means is provided for introducing effluent flow outletting the chamber into the outer containment housing interior space for condensing solvent from the effluent therein as a primary condensate fraction collecting in the primary condensate collection well. A means for communicating the interior space of the outer containment housing interior space with an inlet of the vacuum pump is provided so that effluent in the outer containment housing interior space containing any uncondensed solvent can pass to the vacuum pump. Means for introducing exhaust effluent outletting the vacuum pump into the interior space of the inner containment housing for condensing solvent therein as a secondary condensate fraction collecting in the secondary condensate well is provided, as is means for venting the interior space of the inner containment housing to pass solvents free effluent gas to ambient atmosphere. Means is provided for introducing a refrigerating agent into the interior space of the outer containment housing in a closed flow course therein to maintain the inner containment housing interior space at a solvents condensing temperature condition. The refrigerant flow course includes a winding course part passing proximal the inner containment housing thereby to cool said inner containment housing sufficiently to maintain a solvents condensing temperature in the interior space of said inner containment housing.

According to a feature of the invention, there is further provided a condenser cold trap unit for recovering as primary and secondary condensate fractions solvents contained in an effluent drawn from products being dried in a chamber maintained under a condition of vacuum by a vacuum pump which comprises outer and inner elongated containment vessels, each containment vessel having a top opening and a bottom head. The inner containment vessel is disposed in the outer containment vessel codirectionally therewith and such that the top openings of the respective vessels are planar aligned. An outer surface of the inner containment vessel is spaced from an interior surface of the outer containment vessel, and the bottom head of the inner containment vessel is spaced from the bottom head of the outer containment vessel to define a primary condensate collection well. An interior space of the inner containment vessel provides a secondary condensate collection well. A cover is set on top of the outer and inner containment vessels, and seal means interveningly engage a bottom face of the cover and top opening defining structure of each containment vessel. This seal means is effective for sealing the outer containment vessel interior space against atmospheric airflow thereto and against inflow/outflow communication between said outer containment interior space and the inner containment vessel interior space. An inlet tube is provided on the cover through which effluent outletting the chamber can be introduced into the outer containment vessel interior space for condensing solvent therefrom as a primary condensate fraction collecting in the primary condensate collection well. An outlet tube on the cover for communicates the outer containment vessel with an inlet of the vacuum pump so that effluent containing any uncondensed solvent can pass to the vacuum pump. An inlet pump on the cover is provided for inletting exhaust effluent flow from an outlet of the vacuum pump to the inner containment vessel interior space for condensing solvent therein as a secondary condensate fraction collecting in the secondary condensate well. A vent pipe on the cover vents solvents free effluent gas to ambient atmosphere. A cooling coil encircles the outer surface of the inner containment vessel and it has windings which extend downwardly a distance below the inner containment vessel bottom head into the collection well area of the outer containment vessel. Thus refrigerant fluid passing through the cooling coil serves to cool both the interior space of the inner containment vessel and that of the outer containment vessel interior space to solvents condensing temperatures.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The condenser cold trap unit is described herein as used in a biological specimen drying operation. The specimen drying occurs in a centrifugal vacuum concentrator such as one sold by Savant Instruments, Inc., of Holbrook, N.Y. under the trademark SPEEDVAC. In that drying operation the cold trap unit is used to recover solvents evolved from the specimen material during drying, the solvents being contained in an effluent flowing from the vacuum drying chamber.

The cold trap unit of the invention as a single unit condenses solvents as separate primary and secondary fractions thereof in separate condensing chambers utilizing a common refrigeration means to maintain solvent condensing temperature level in the separate condensing chambers thereby eliminating the more costly prior practice of using two separate cold traps for the same purpose.

Use of the cold trap unit need not be limited to the drying of biological specimens. It can be used in other operations where condensing operations are practiced seriatim in separate self contained condensers to recover condensate fraction in the first condenser, any carryover condensibles left in the effluent being liberated in a second following flow course located condenser.

Figure 1:
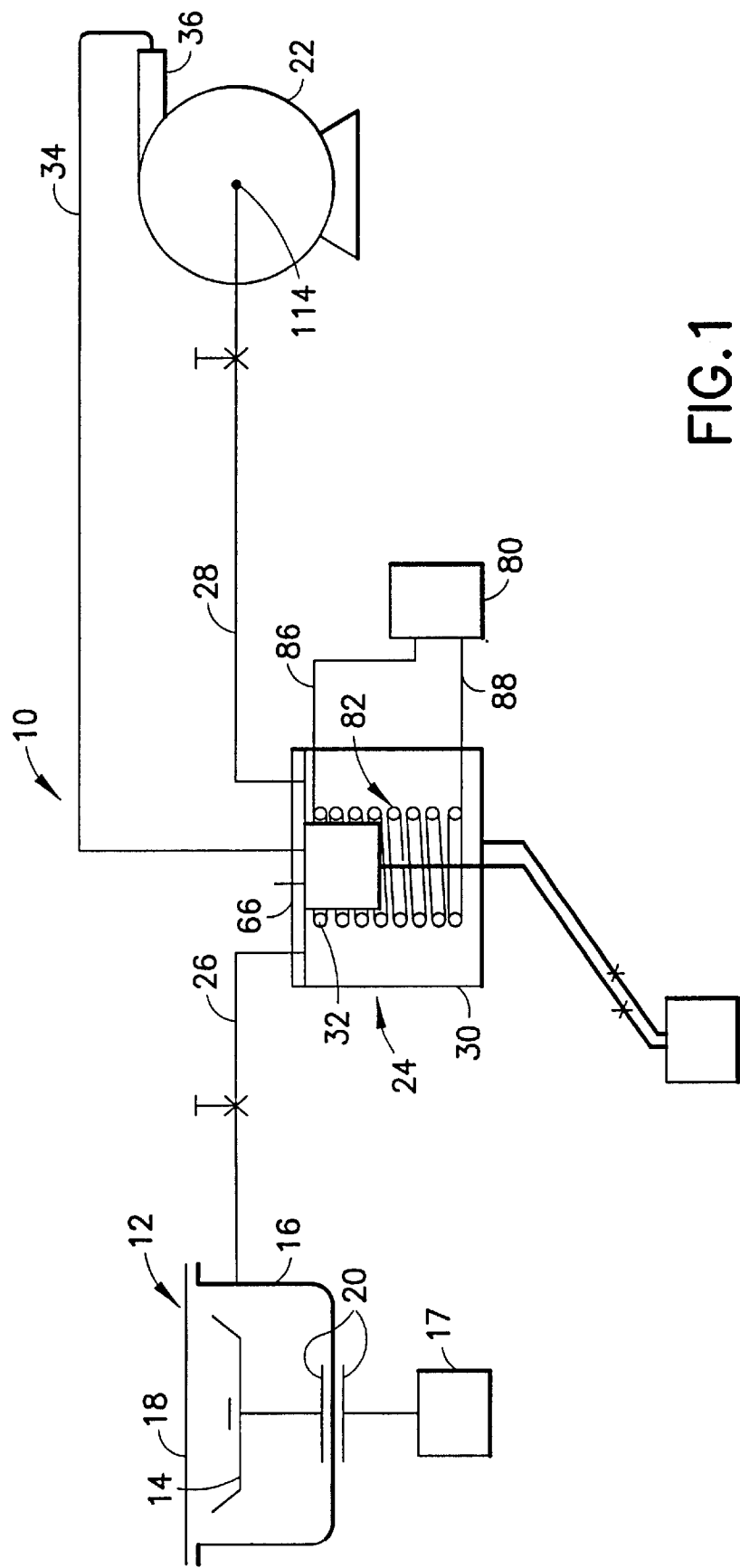
FIG. 1 is a schematic depiction of vacuum drying apparatus in which the condenser cold trap unit is embodied.

Referring now to FIG. 1, vacuum drying system 10 includes centrifugal vacuum concentrator 12 in which, e.g., biological samples are mounted on a rotor 14 carried inside vacuum chamber defining housing 16 which is sealed with cover 18, the rotor 14 being driven by externally located motor 17 through magnetic coupling arrangement 20.

During a drying or concentration operation, the chamber of housing 16 is maintained under a condition of vacuum by vacuum pump 22, and the chamber may be supplied with heat to facilitate drying. As a specimen is dried, solvent in which the specimen was contained evolves as an effluent that is directed from the vacuum chamber via piping 26 to cold trap unit 24 wherein solvent is condensed from the effluent before it passes out of the cold trap unit in its passage to the inlet of vacuum pump through piping 28.

Cold trap unit 24 is comprised of an outer containment vessel 30 and an inner containment vessel 32. Outer containment vessel 30 provides in an interior space thereof for condensing a primary solvents fraction from the effluent. It is understood that such condensing of the effluent may not be complete as to all solvent that was present in the effluent so that solvent may be retained in the effluent flow passed from the outer containment vessel to the vacuum pump.

Since solvents can be hazardous to humans and since any such received in the vacuum pump will pass out in pump exhaust, this exhaust effluent is subjected to a further condensing operation before the effluent is vented to atmosphere in order to recover as a secondary fraction, any solvents carryover in the effluent. The interior space of inner containment vessel 32 is where this further condensing of any solvents carried over in effluent from the condensing operation in outer containment vessel 30 is effected providing a secondary condensate fraction. Piping 34 connects the discharge outlet 36 of vacuum pump 22 to the inner containment vessel 32.

Figure 2:
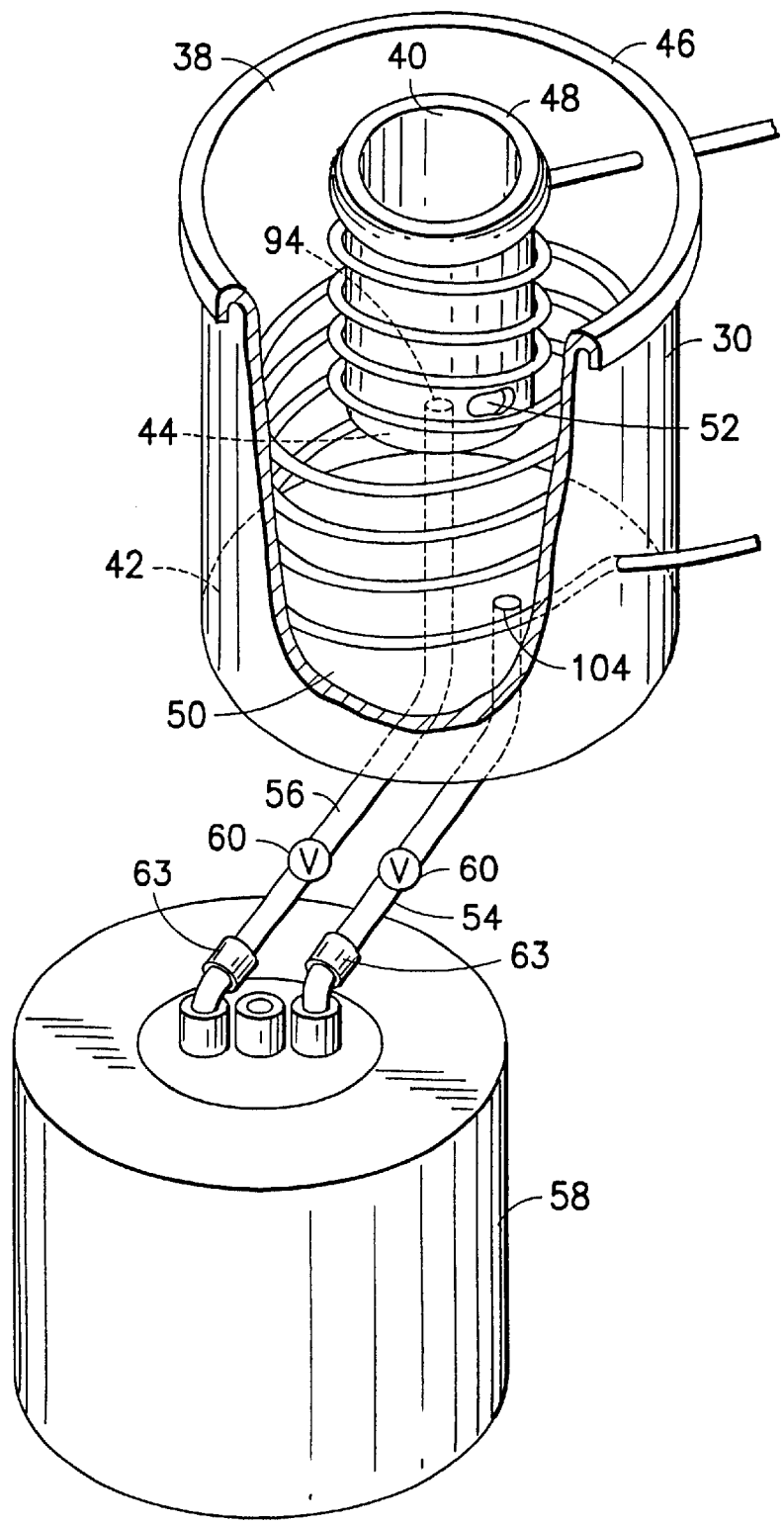
FIG. 2 is perspective showing of the cold trap unit with portions of the outer containment vessel broken away, the cover not being shown, a solvents disposal location to which solvents condensed in the cold trap unit can be drained being shown.

Referring to FIG. 2, outer containment vessel 30 and inner containment vessel 32 in preferred, but not essential embodiment, are elongated cylindrical in form, have respective top openings 38, 40, and respective bottom heads 42, 44. Each vessel is provided with respective annular radially outwardly directed flanges 46, 48, and the inner vessel 32 is of narrower width and shorter length than vessel 30 so that the inner containment vessel 32 readily can be positioned within the outer vessel with the top openings in coplanar alignment.

In a preferred but not essential arrangement, inner containment vessel 32 will be coaxially disposed with the outer containment vessel 30. The interior space of the outer vessel 30 present between its inner wall surface and the outer wall surface of inner vessel 32 as well as space below the bottom head 44 of the inner vessel, define a condensing space for solvent with a lowermost part of the outer vessel interior space serving as a primary solvents fraction collection well 50.

The interior space of inner containment vessel 32 functions as the condensing space and collection well 52 for secondary solvents fraction. As seen in FIG. 2, respective drain lines 54, 56 are used to empty collected primary and secondary solvents fraction from the containment vessels 30, 32 to an outside hazardous materials collection container 58, these lines being fitted with drain valves 60 and quick connect/disconnect fittings 63 to facilitate exchange of a filled collection chamber 58 with an empty one.

Figure 3:
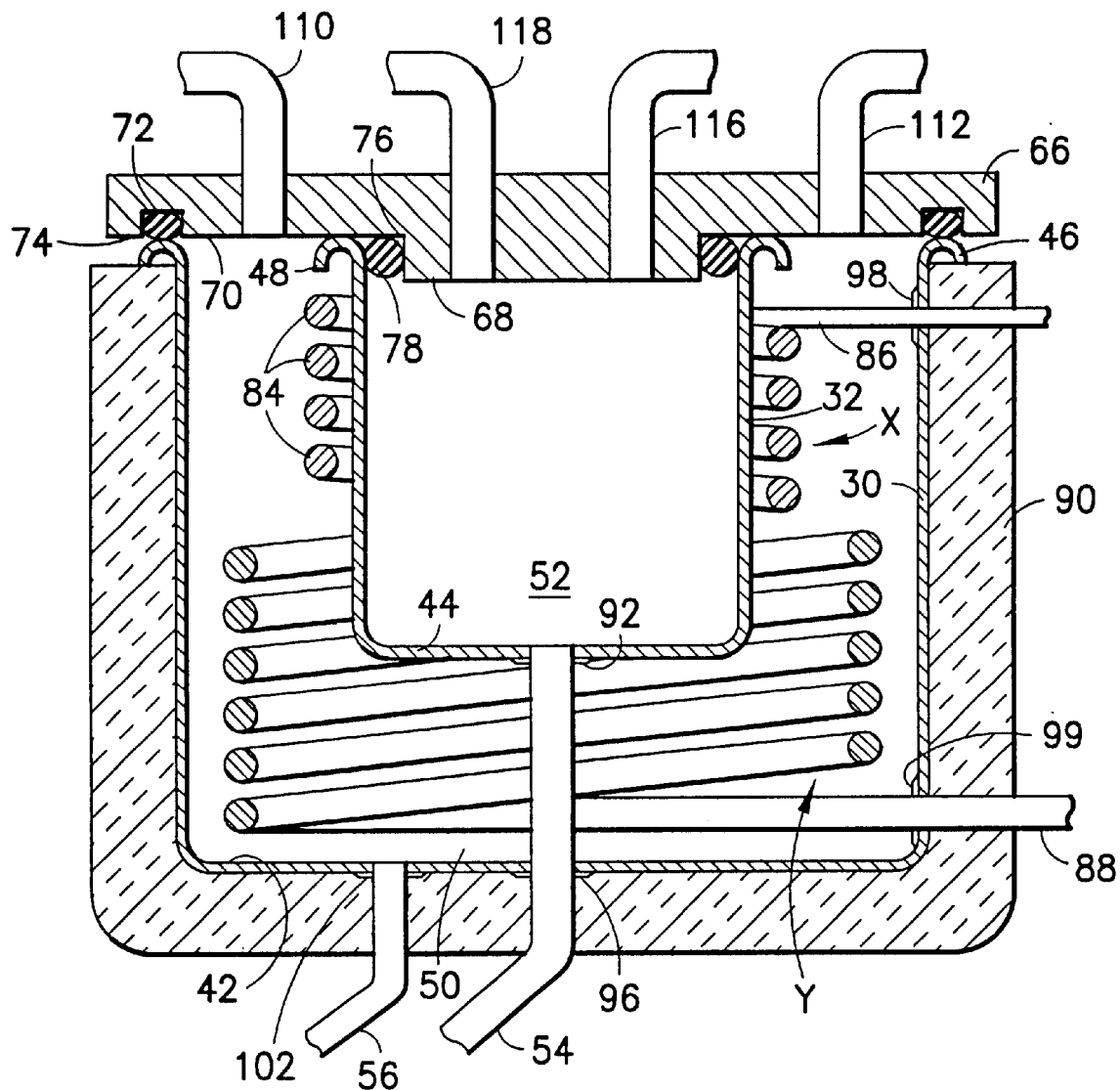
FIG. 3 is a vertical central sectional view of the cold trap showing constructional details thereof.

With reference to FIG. 3, a cover 66 is set on top of the containment vessels 30, 32 and covers the respective top openings 38, 40. A central portion 68 of the cover is stepped down and that step down is inserted a short distance into the inner containment vessel 32, the remainder bottom face portion 70 of the cover being set over the flange 46 of the outer containment vessel 30.

Cover 66 cooperates with seal means as will be described to seal the interior space of the outer containment vessel 30 from communication with the outside atmosphere, this to insure maintenance of a vacuum condition in that space. The seal means also prevents an inflow/outflow communications between the interior spaces of the two containment vessels.

Remainder bottom face portion 70 of the cover has an annular groove 72 therein and this groove is in register with the annular flange 46 on outer containment vessel 30. A seal member such as O-ring 74 is received in groove 72, the O-ring sitting on top of flange 46. A shoulder 76 is formed where the bottom face portion 70 of the cover meets the cover step down portion 68 of the cover.

Another O-ring 78 is received encirclingly against this shoulder 76 and an opposite side of the O-ring engages the inside surface of inner containment vessel 32 proximal the level of inner vessel flange 48. When the cover is placed on top of inner vessel 32 and the step down portion 68 inserted in top opening 40, O-ring 78 will be deformed against the shoulder and inner vessel structure surfaces to effect a continuous sealing about the top opening 40 so that no communication exists between the interior space of inner vessel 32 and that of outer vessel 30.

Instead of using shoulder 76 as the placement location of O-ring 78, an annular groove similar to groove 72 could be used to receive O-ring 78 and it would rest on flange 48 of the inner vessel 32. The use of the shoulder 76 is preferred though as an adjunct of the step down structure 68 which is advantageous for allowing alignment insertion of cover structure into inner vessel as contributing to the cover hold down as next described.

No special securement of the cover 68 on the vessels 30, 32 is required since during the drying operation, the condition of vacuum in the interior space of the outer vessels results in a very strong hold down force of atmospheric pressure acting on the cover 68. This insures maintaining it tightly in place on the vessels in manner as compresses O-rings 74 and 78 into sealing contact with adjacent cover and vessel surfaces wherein sealing is established.

The cold trap unit 12 requires maintenance in the condensing spaces thereof, of temperatures substantially below zero degrees C. For that purpose and referring to FIGS. 1–3, a refrigeration unit 80 is provided to supply refrigerant gas flow to coil unit 82 in the cold trap unit so that refrigerant gas in its closed course flow through the cold trap unit, i.e., through the coil unit, draws heat from the interior space of vessel 30, the effluent products therein and also from wall structure of vessel 32.

Coil unit 82 comprises a vertically arrayed plurality of coils 84 having a winding course proximally encircling the outer surface of inner vessel 32 from top to bottom of said vessel. The winding course around the outer surface of inner vessel 32 also could be in a close conforming winding around that vessel an even in contact with its external surface.

A refrigerant supply tube 86 connects unit 80 to the coil unit, e.g., to the topmost coil winding, and a return tube 88 connects the lowermost coil winding to unit 80 for return of heat laden gas thereto. Supply tube 86 and return tube 88 pass through the wall of outer vessel 30 and can be secured thereto where pass through occurs to have an air excluding joint at the pass through locations.

The upper course part X of the coil windings is as stated, close to the exterior wall of vessel 32. The lower course part on the other hand is laterally widened out in windings that extend closely proximal the inner surface of outer vessel 30. The widening of the coil lower course windings is to enlarge the coil condensing surface area in well area 50 available for effecting effluent condensation. Major condensation of effluent occurs on the windings. Condensation of effluent also takes place on the inner wall of vessel 30, on the outer wall of vessel 32 and to some degree in the interior space of vessel 30.

The cooling functioning of the windings can be expected to reduce the temperature in the outer vessel interior space to about minus 55 degrees C., and in the interior space of the inner vessel to about minus 25 degrees C., both temperatures being at levels effective to condense any solvents present in those spaces. To enhance maintenance of solvents condensing temperatures in the two vessels interior spaces, a barrier layer of thermal insulation 90 is provided about the exterior surface of outer vessel 30 as well as at the outside of bottom head 42.

A feature of the invention is that the cold trap includes the outer vessel 30 and inner vessels 32 as an integral structure. Drain pipe 54 is fixed as at 92 to the bottom 44 of inner vessel 32 in register with a drain opening 94 of the inner vessel. Due to the corrosive nature of solvents, the vessels, piping and other components of the cold trap unit preferably will be made of stainless steel and the fixing of components to the vessels will be with welding or brazing.

Also, the drain pipe 54 will be fixed as at 96 to the bottom 42 of the outer vessel 30 where it passes therethrough. Further the refrigerant supply tube 86 and return tube 88 will be fixed as at 98, 99 to the wall of the outer vessel. Due to the foregoing, the two vessels 30, 32 and the coil unit 80 comprise a unitary structure with positioning of the inner vessel securely fixed within the outer vessel.

Drain pipe 56 also is fixed as at 102 to the bottom head 42 of vessel 30, it being in register with a drain opening 104 in said bottom head.

Description will be given now of the operation of the cold trap unit. During the drying of specimens, effluent containing solvents will be drawn from the chamber of housing 16 through piping 26. Cover 66 of the cold trap unit has an inlet tube 110 to which the piping 26 is connected, the inlet tube communicating with the interior space of the outer vessel 30 so that the effluent is introduced into such space. Since the temperature in the interior space of the outer vessel is one at which solvent present in the said space will condense, such occurs and the condensate collects as a primary condensate fraction in well 50.

The effluent, less condensed solvents, outflows from the interior space through outlet tube 112 which is connected to the inlet 114 of vacuum pump 22. The effluent and any carryover uncondensed solvents will pass through the vacuum pump and to its outlet 36. The exhaust from outlet 36 is connected to an inlet tube 116 in cover 66, this inlet tube directing pump exhaust into the interior space of inner vessel 32. Carryover solvents in the effluent exhaust flow will condense as a secondary condensate fraction in inner vessel 32 and collect in its collection well 52. Remaining solvent free effluent gas will vent through venting tube 118 to atmosphere.

Frosting of the coil unit during the drying operation, can be removed by back feeding hot refrigerant gas through the coil unit to melt the frost from the coil windings.

After specimen drying is completed, vacuum in the drying system can be broken and the inner and outer vessels drained of solvents condensate collected therein, these being drained to hazardous materials collection container 58.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A condenser cold trap unit for recovering as primary and secondary condensate fractions solvents contained in an effluent drawn from products being dried in a chamber maintained under a condition of vacuum by a vacuum pump, said condenser cold trap comprising, an outer containment housing, an inner containment housing within the outer containment housing, the outer containment housing having an interior space at least a part of which provides a primary condensate collection well, the said inner containment housing having an interior space proving a secondary condensate collection well, the outer containment housing interior space being sealed against any inflow thereto of ambient atmospheric air and against any inflow/outflow communication between said outer containment housing interior space and said inner containment housing interior space, means for introducing effluent flow outletting the chamber into the outer containment housing interior space for condensing solvent from the effluent therein as a primary condensate fraction collecting in the primary condensate collection well, means for communicating the interior space of said outer containment housing with an inlet of the vacuum pump so that effluent in said outer containment housing interior space containing any uncondensed solvent can pass to said vacuum pump, means for introducing exhaust effluent outletting the vacuum pump into the interior space of said inner containment housing for condensing solvent therein as a secondary condensate fraction collecting in the secondary condensate well, means for venting the interior space of said inner containment housing to pass solvents free effluent gas to ambient atmosphere, and means for introducing a refrigerating agent into the interior space of said outer containment housing in a closed flow course therein to maintain said inner containment housing interior space at a solvents condensing temperature condition, said refrigerant flow course including a winding course part passing proximal said inner containment housing thereby to cool said inner containment housing sufficiently to maintain a solvents condensing temperature in the interior space of said inner containment housing.

2. The condenser cold trap unit of claim 1 in which the outer containment housing is an elongated vessel having a top opening, the inner containment housing being an elongated vessel of shorter length and narrower width than the outer containment vessel, said shorter length vessel having a top opening and extending codirectionally with said containment vessel, top opening closure means closing off the top openings of both the outer containment vessel and the inner containment vessel, and seal means disposed on structure parts of said outer and said inner containment vessels adjacent to and encircling the top openings of the respective vessels, said top openings closure means tightly engaging said seal means for maintaining sealing of the interior space of the outer containment vessel against ambient atmospheric air inflow thereto and sealing against inflow/outflow communication between said outer containment vessel interior space and the interior space of said inner containment vessel.

3. The condenser cold trap of claim 2 further comprising a layer of thermal insulation covering the outer surface of said outer containment vessel.

4. The condenser cold trap of claim 2 in which the inner containment vessel is disposed coaxially with said outer containment vessel.

5. The condenser cold trap of claim 2 in which the top opening of the outer containment vessel and the top opening of the inner containment vessel are generally coplanar disposed.

6. The condenser cold trap of claim 2 in which the outer and inner containment vessels each are of open top hollow cylindrical configuration.

7. The condenser cold trap of claim 5 in which each of the hollow cylindrical inner and outer containment vessels includes an external annular flange adjacent its top opening, said seal means being tightly engaged between said closure means and the external flange of each of said inner and outer containment vessels.

8. The condenser cold trap of claim 7 in which said closure means comprises a cover plate, the cover plate having grooves at a containment facing surface thereof in which said seal means are received.

9. The condenser cold trap of claim 8 in which the seal means comprise O-rings.

10. The condenser cold trap of claim 1 further comprising drain means at a bottom part of each of said outer and inner containment housings for draining from the condensate collection wells of said containment housings condensed solvents fractions collected therein to a disposal source exterior of said containment housings.

11. A condenser cold trap unit for recovering as primary and secondary condensate fractions solvents contained in an effluent drawn from products being dried in a chamber maintained under a condition of vacuum by a vacuum pump, said condenser cold trap comprising, outer and inner elongated containment vessels, each containment vessel having a top opening and a bottom head, the inner containment vessel being disposed in the outer containment vessel codirectionally therewith and such that the top openings of the respective vessels are planar aligned, an outer surface of the inner containment vessel is spaced from an interior surface of the outer containment vessel, and the bottom head of the inner containment vessel is spaced from the bottom head of the outer containment vessel to define a primary condensate collection well, an interior space of the inner containment vessel providing a secondary condensate collection well, a cover set on top of the outer and inner containment vessels, seal means interveningly engaging a bottom face of said cover and top opening defining structure of each containment vessel, said seal means being effective for sealing outer containment vessel interior space against atmospheric airflow thereto and against inflow/outflow communication between said outer containment interior space and the inner containment vessel interior space, an inlet tube on the cover through which effluent outletting the chamber can be introduced into the outer containment vessel interior space for condensing solvent therefrom as a primary condensate fraction collecting in the primary condensate collection well, an outlet tube on the cover for communicating the outer containment vessel with an inlet of the vacuum pump so that effluent containing any uncondensed solvent can pass to the vacuum pump, an inlet pipe on the cover for inletting exhaust effluent flow from an outlet of the vacuum pump to the inner containment vessel interior space for condensing solvent therein as a secondary condensate fraction collecting in the secondary condensate well, a vent pipe on the cover for venting solvents free effluent gas to ambient atmosphere, and a cooling coil having an upper coil portion wherein coil windings encircle the outer surface of said inner containment vessel proximal therewith, and a lower coil portion wherein coil extending downwardly below said inner containment vessel bottom head so that a refrigerant fluid passing through the cooling coil cools can cool the interior space of the inner containment vessel and that of the outer containment vessel interior space to solvents condensing temperatures.

12. The condenser cold trap of claim 11 in which the windings of the lower coil portion are laterally widened out and pass closely proximal the inner surface of said outer containment vessel.

13. The condenser cold trap unit of claim 11 in which the inner and outer containment vessels are cylindrically configured coaxially disposed vessels, the top opening defining structure of each comprising annular radially outwardly disposed flanges, the seal means being received on said flanges, the bottom head of each of said inner and outer containment vessels having an outlet through which condensate collected in the respective condensate collection wells can be drained to an extra vessel located solvents disposal location.

14. A condenser cold trap comprising as a unitary structure, an elongated inner vessel having a bottom head and a top opening, the inner vessel being spaced inwardly from an encircling wall of an elongated outer vessel, the outer vessel having a top opening and a bottom head spaced below the inner vessel bottom head, a drain pipe fixedly attached to the bottom head of said inner vessel and extending downwardly therefrom through the bottom head of said outer vessel, and drain pipe being fixed to said outer vessel bottom head to support the inner vessel fixed positioned within said outer vessel, and a coil encircling an outer periphery of said inner vessel, said coil extending downwardly below the inner vessel to a location proximal the bottom head of said outer vessel, said coil having lead in and lead out runs passing laterally through the encircling wall of the outer vessel and being fixed thereto so that a refrigerant agent can be passed through the coil to maintain the interior of said outer vessel and the interior of said inner vessel at a solvents condensing temperature condition, a cover receivable on top of said inner vessel and said outer vessel closing over the top openings of each of said vessels, there being seal means intervening a bottom face of said cover and top opening defining structure of each of said vessels, said seal means sealing interior space of said outer vessel from communication with outside ambient atmosphere, said seal means further sealing with outer vessel interior space against inflow/outflow communication between said outer vessel interior space and interior space of said inner vessel, said cover carrying flow inlet and flow outlet means in communication with the interior space of said outer vessel so that a solvents containing effluent flow can be drawn through said outer vessel space interior space to condense solvents therefrom, said cover further carrying a delivery opening in communication with the interior space of the inner vessel through which exhaust effluent from a prior solvents condensing operation can be introduced into said inner vessel interior space to condense any solvents therein, said cover having a vent pipe communicating the inner vessel interior space with atmosphere to vent solvents free gas from said inner vessel interior space.

\* \* \* \* \*